United States Patent
Murrin et al.

(10) Patent No.: US 10,255,161 B2
(45) Date of Patent: Apr. 9, 2019

(54) LOGGING EVENTS WITH TIMESTAMPS

(71) Applicant: Imagination Technologies Limited, Kings Langley (GB)

(72) Inventors: Paul Murrin, Chepstow (GB); Gareth Davies, Rickmansworth (GB)

(73) Assignee: Imagination Technologies Limited, Kings Langley (GB)

( * ) Notice: Subject to any disclaimer, the term of this patent is extended or adjusted under 35 U.S.C. 154(b) by 89 days.

(21) Appl. No.: 15/079,580

(22) Filed: Mar. 24, 2016

(65) Prior Publication Data
US 2016/0283312 A1    Sep. 29, 2016

(30) Foreign Application Priority Data
Mar. 24, 2015  (GB) .................................. 1504975.2

(51) Int. Cl.
*G06F 11/00*    (2006.01)
*G06F 11/36*    (2006.01)
(Continued)

(52) U.S. Cl.
CPC .......... *G06F 11/3636* (2013.01); *G06F 17/40* (2013.01); *G06F 11/3466* (2013.01);
(Continued)

(58) Field of Classification Search
CPC ............. G06F 11/0787; G06F 11/0706; G06F 11/0751; G06F 11/3636; G06F 11/3466;
(Continued)

(56) References Cited

U.S. PATENT DOCUMENTS 9,002,854 B2 *    4/2015    Baum ............... G06F 17/30551
                                                  707/746
2003/0126490 A1    7/2003    Litt et al.
(Continued)

OTHER PUBLICATIONS

Kraft, J., Wall, A., & Kienle, H. (Nov. 2010). Trace recording for embedded systems: Lessons learned from five industrial projects. In International Conference on Runtime Verification (pp. 315-329). Springer, Berlin, Heidelberg. (Year: 2010).*
(Continued)

*Primary Examiner* — Anthony J Amoroso
(74) *Attorney, Agent, or Firm* — Vorys, Sater, Seymour and Pease LLP; Vincent M DeLuca

(57) ABSTRACT

A logging unit is used to log entries for events in a computer system. Each entry includes an n-bit timestamp field and a payload. The payload includes information about the event and the timestamp field includes the n least significant bits of an N-bit timestamp for the event, where $N>n$. If the n least significant bits of the timestamp have wrapped compared to the corresponding n bits of the timestamp of the preceding entry then a timing entry is logged which includes other bits of the timestamp. Therefore, an N-bit timestamp can be determined for an event, but only the n least significant bits of the timestamp are stored in the timestamp field of an entry for the event. Therefore, the time flow of events in the store is better maintained (by having a larger timestamp) without increasing the number of bits (n) in the timestamp field of each entry.

20 Claims, 7 Drawing Sheets

(51) Int. Cl.
*G06F 17/40* (2006.01)
*G06F 11/34* (2006.01)

(52) U.S. Cl.
CPC .... *G06F 11/3476* (2013.01); *G06F 2201/835* (2013.01); *G06F 2201/86* (2013.01)

(58) Field of Classification Search
CPC ............ G06F 11/3476; G06F 11/0766; G06F 11/1407; G06F 11/30; G06F 11/3065; G06F 11/3068; G06F 11/3072; G06F 11/3075; G06F 11/3086; G06F 11/34; G06F 17/40; G06F 17/30353; G06F 2001/835; G06F 2201/86; G06F 2211/004; G06F 2212/7209; G06F 2221/2153
See application file for complete search history.

(56) References Cited

U.S. PATENT DOCUMENTS

| | | | |
|---|---|---|---|
| 2009/0271434 A1* | 10/2009 | George | G06F 11/3636 |
| 2013/0080820 A1* | 3/2013 | Swoboda | G06F 13/38 713/600 |
| 2013/0307509 A1* | 11/2013 | Henzler | H03K 7/08 323/283 |
| 2015/0082325 A1* | 3/2015 | Aharonov | G06F 9/4825 719/318 |

OTHER PUBLICATIONS

Kraft et al "Trace Recording for Embedded Systems: Lessons Learned from Five. Industrial Projects" Runtime Verification, published 2010, Springer, pp. 315-329, vol. 6418, Kraft et al, ISBN 978-3-642-16611-2 ; ISBN 3-642-16611-3.

Arcas et al "A Low-Overhead Profiling and Visualization Framework for Hybrid Transactional Memory" IEEE 20th Annual International Symposium on Field-Programmable Custom Computing Machines (FCCM), published 2012, IEEE, pp. 1-8, ISBN 978-1-4673-1605-7 ; ISBN 1-4673-1605-9.

Baker, Kenneth F.; A Priority Event Monitor for an Interrupt-Driven Microprocessor; pp. 905-909; Apr. 7, 1991; XP010045035.

* cited by examiner

| | TS field | ID field | Data field |
|---|---|---|---|
| 602 | $TS_0$ | $ID_t$ | k MSBs of TS for event 0 |
| 604 | $TS_0$ | $ID_0$ | Event 0 data |
| 606 | $TS_1$ | $ID_1$ | Event 1 data |
| 608 | $TS_2$ | $ID_2$ | Event 2 data |
| 610 | $TS_3$ | $ID_3$ | Event 3 data |
| 612 | $TS_4$ | $ID_t$ | k MSBs of TS for event 4 |
| 614 | $TS_4$ | $ID_4$ | Event 4 data |

| | TS field | ID field | Data field |
|---|---|---|---|
| 1002 | $TS_0$ | $ID_{t2}$ | m bits of TS for event 0 |
| 1004 | $TS_0$ | $ID_{t1}$ | k bits of TS for event 0 |
| 1006 | $TS_0$ | $ID_0$ | Event 0 data |
| 1008 | $TS_1$ | $ID_1$ | Event 1 data |
| 1010 | $TS_2$ | $ID_2$ | Event 2 data |
| 1012 | $TS_3$ | $ID_{t1}$ | k bits of TS for event 3 |
| 1014 | $TS_3$ | $ID_3$ | Event 3 data |
| 1016 | $TS_4$ | $ID_4$ | Event 4 data |
| 1018 | $TS_5$ | $ID_{t2}$ | m bits of TS for event 5 |
| 1020 | $TS_5$ | $ID_{t1}$ | k bits of TS for event 5 |
| 1022 | $TS_5$ | $ID_5$ | Event 5 data |

LOGGING EVENTS WITH TIMESTAMPS

BACKGROUND

It is often useful to log information about events that occur in computer systems. The events could be any occurrence (e.g. an action or a process) about which information may subsequently be useful. Furthermore, the information that is logged could be of any suitable type that may be useful.

Tracing is an example of logging which is used to record information, in a trace log, about a program's execution. The information may, for example, be used by programmers for debugging purposes. The information contained in the trace log may also be used by system administrators and/or technical support personnel to diagnose problems with software. Some examples of events that may cause data to be stored in a trace log are: an exception being thrown by a program, reading data from a memory, changing the value of a variable, etc. Each of the events will occur at a particular time, and the trace log stores a timestamp with each event to indicate a time of the event. Therefore, by analysing the data stored in the trace log, a time flow of events in the computer system can be identified.

For each event, an entry can be stored in a store, i.e. in the trace log. As an example, the store may be configured to store 48-bit entries for events. FIG. 1 shows an example of an entry 100 which includes 48 bits, wherein the entry includes an 18-bit timestamp field 102, a 6-bit ID field 104 and a 24-bit data field 106. The ID field 104 and the data field 106 may collectively be referred to as the "payload" of the entry, such that the entry includes a timestamp and a payload. When an event occurs which is to be logged, a timestamp for the event can be determined (e.g. based on a clock in the computer system). In this example, the timestamp includes 18 bits which are to be stored in the timestamp field 102 for the event. The ID field 104 includes an indication of the processing element (e.g. a CPU, signal processing unit or other processing element within the computer system) that caused the event to occur. The data field 106 includes data relating to the event that occurred, e.g. to indicate that an exception has occurred, to indicate that a variable has changed its value, or any other suitable information relating to an event.

The frequency with which events occur can be different for different computer systems, and can vary over time. For example, a Digital Signal Processor (DSP) may operate, causing events to occur very quickly while data signals are being transmitted or received from or to a computer system, but the frequency with which events occur may decrease when the computer system ceases transmitting or receiving the signals.

A timing clock may be used to determine the timestamps for the events to be logged in the store. Using a faster timing clock increases the resolution of the timestamps which allows greater precision to be identified in the timing of events, but causes the timestamp to "wrap around" more frequently. Such a timestamp is an example of a modular arithmetic system wherein numbers are said to "wrap around" when they reach a certain value known as the modulus. For example, if 18 bits are used for the timestamps for the events, as shown in FIG. 1, then the modulus is $2^{18}$, that is $2^{18}$ unique timestamps are available, and after $2^{18}$ timer ticks, the timestamp will cycle back to the first value. That is, with an n-bit timestamp and a timing clock frequency of f, the timestamp of an event at time t will be the same as the timestamp of an event at time $$t + \frac{2^n}{f}.$$

The timestamp "wraps around" when it increments from its maximum value to return back to its minimum value, e.g. a $2^n$-bit timestamp will wrap around when it increments from a value of $2^n-1$ back to zero.

As an example, a signal processing unit such as a DSP will use a relatively high frequency timing clock for the event logging because events occur very quickly in signal processing units and the timestamps preferably have enough resolution to indicate the relative timings of events in the computer system. For example, the frequency of the timing clock may be 350 MHz, which means that with a $2^{18}$-bit timestamp, the timestamp will wrap every 749 μs $$\left(\text{i.e. } \frac{2^{18}}{350 \text{ MHz}} = 749 \text{ μs}\right).$$

This means that the timestamps may become ambiguous over a period of time greater than 749 μs. That is, if there is a period of at least 749 μs during which no events are logged, then the correct time flow of the events in the trace log is lost. It is noted that the events may occur at irregular intervals. One way to keep unambiguous timestamps over a greater period of time and to reduce the likelihood of losing the correct time flow in this way, is to increase the number of bits used for the timestamp. For example, if 24 bits are used for the timestamp, with a timing clock at 350 MHz, then the timestamp will wrap every 47.9 ms $$\left(\text{i.e. } \frac{2^{24}}{350 \text{ MHz}} = 47.9 \text{ ms}\right).$$

Therefore there would have to be a much longer period (64 times as long) during which no events occurred for the timestamps to become ambiguous and for the correct time flow of the events to be lost.

However, there are often tight constraints on the amount of data that can be stored in the trace log, and so it may be detrimental to increase the size of each entry to allow for more timestamp bits. This is particularly the case in computer systems in which events occur at high frequencies, such as in computer systems including signal processing units. So it may not be beneficial to increase the number of bits in each entry that is stored in the trace log. Therefore, if the number of bits used for the timestamp is increased then the number of bits that can be used in the payload of the entry (i.e. in the ID field and the data field) would be reduced. However, this might not be desirable because fewer payload bits would mean that less information for an event can be stored in an entry.

So, when setting the format of the entries for events, there is a trade-off between the number of timestamp bits and the number of payload bits within the entries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a logging unit for logging events by causing entries to be stored in a store, wherein each of said entries comprises an n-bit timestamp field and a payload, the logging unit comprising control logic configured to: determine a timestamp for an event which is to be logged, wherein the determined timestamp comprises N bits, where N>n; cause a timing entry which includes a set of k bits of the determined timestamp to be stored in the store if one or more of the N−n most significant bits of the determined timestamp are different to a corresponding one or more of the N−n most significant bits of a timestamp for a preceding event for which a preceding entry is stored in the store, said k bits being more significant bits of the determined timestamp than the n least significant bits of the determined timestamp; and cause an entry for the event to be stored in the store, wherein the n least significant bits of the determined timestamp are included in the timestamp field of the entry for the event. For example, said k bits may be the k next least significant bits of the determined timestamp other than the n least significant bits of the determined timestamp.

There is provided a method of logging events by storing entries in a store, each of said entries comprising an n-bit timestamp field and a payload, the method comprising: determining a timestamp for an event which is to be logged, wherein the determined timestamp comprises N bits, where N>n; if one or more of the N−n most significant bits of the determined timestamp are different to a corresponding one or more of the N−n most significant bits of a timestamp for a preceding event for which a preceding entry is stored in the store, storing a timing entry in the store, said timing entry including a set of k bits of the determined timestamp, said k bits being more significant bits of the determined timestamp than the n least significant bits of the determined timestamp; and storing an entry for the event in the store, wherein the n least significant bits of the determined timestamp are included in the timestamp field of the entry for the event.

There is provided a method of retrieving information relating to a particular event from a store configured to store entries, each of said entries comprising an n-bit timestamp field and a payload, and wherein the particular event is associated with a timestamp comprising N bits, where N>n, the method comprising: reading a particular entry for the particular event from the store, wherein the n least significant bits of the timestamp are included in the timestamp field of the particular entry; identifying a timing entry preceding the particular entry in the store, wherein the identified timing entry includes a set of k bits of the timestamp for the particular entry, said k bits being more significant bits of the timestamp than the n least significant bits of the timestamp; and concatenating the k bits of the timestamp from the identified timing entry with the n bits of the timestamp from the timestamp field of the particular entry, for use in constructing the timestamp for the particular event.

The logging units described herein may be embodied in hardware on an integrated circuit. There may be provided computer readable code adapted to perform the steps of any of the methods described herein when the code is run on a computer. Furthermore, there may be provided computer readable code for generating a logging unit according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
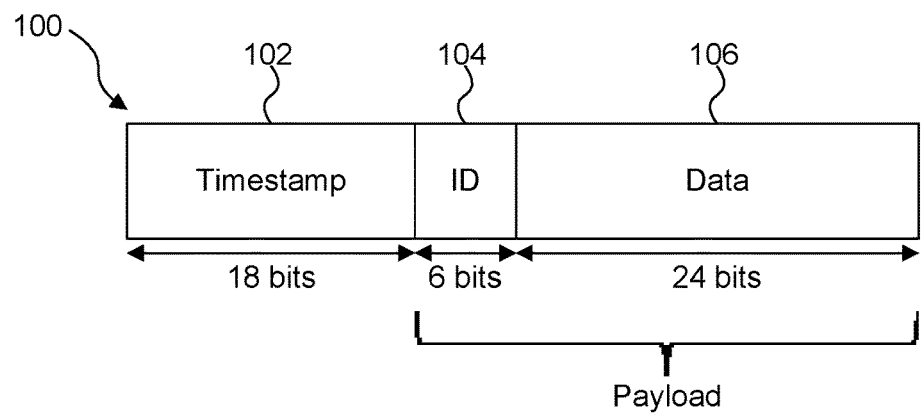
FIG. 1 shows the format of an entry for an event to be logged in a prior art system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

In the examples described herein, the number of bits in a timestamp that is determined for an event can be increased, thereby reducing the frequency with which the timestamp wraps around. This means that the timestamps are unambiguous over a greater length of time and the time flow of the events stored in a logging unit is less frequently lost. This is achieved, whilst simultaneously decreasing the number of timestamp bits included in individual entries for respective events, and without increasing the number of bits of each entry. Therefore, every aspect of the trade-off mentioned in the background section above may be improved or at least maintained.

This may seem counterintuitive, but it is achieved by appreciating that often a sequence of events that are logged will have similar timestamps. In particular, the most significant bits of a sequence of events which occur in quick succession will be the same as each other or very similar to each other. If the most significant bits of the timestamps of a sequence of events are the same as each other then these bits do not need to be stored repeatedly for each of the entries of the sequence of events. Instead, a least significant subsection of the bits of the timestamp (the n least significant bits of the timestamp) can be stored in the timestamp field of the entries for the events. If the n least significant bits of the timestamp have wrapped around (i.e. changed from a value of $2^{n-1}$ to 0) compared to the corresponding n bits of the timestamp of the preceding entry in the trace log then an additional entry is logged which includes other bits (e.g. the most significant bits) of the timestamp. For brevity, such a modulo wrap around will be hereinafter referred to as a "wrap." In this way, an N-bit timestamp can be determined for an event, but only the n least significant bits of the timestamp are stored in an entry for the event, where N>n.

Figure 2:
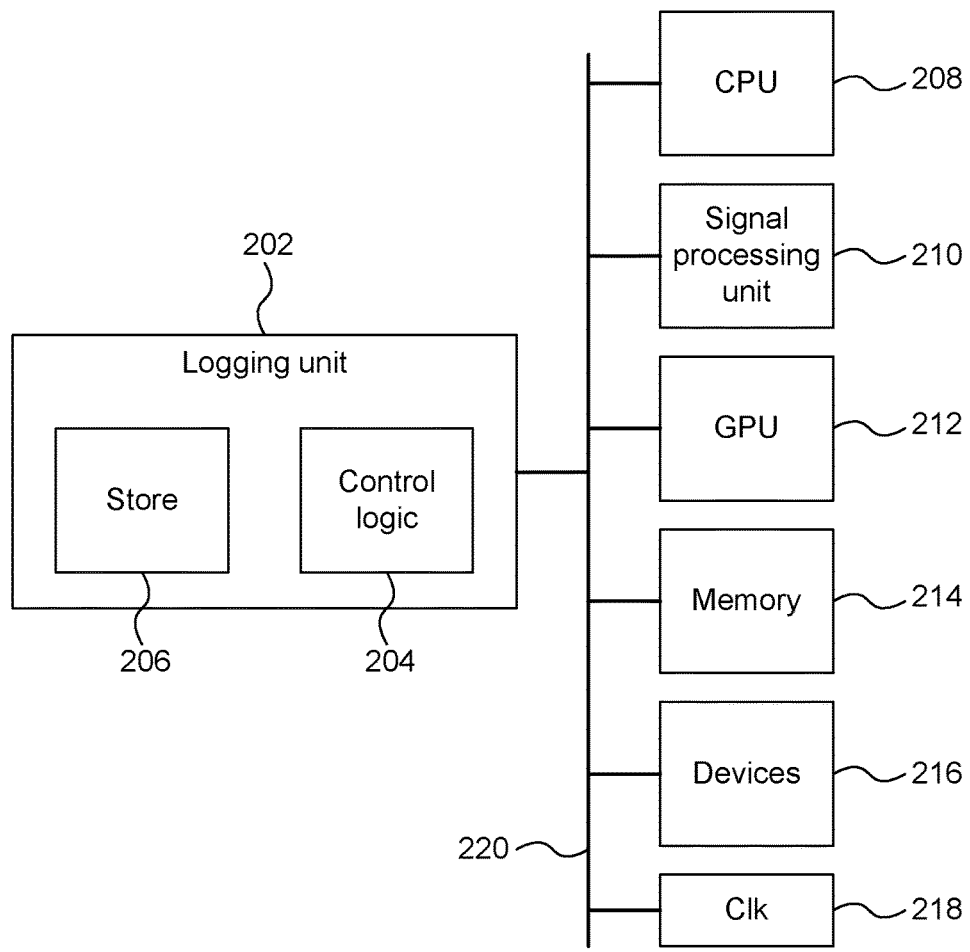
FIG. 2 is a schematic diagram of a computer system including a logging unit.

FIG. 2 shows a computer system including a logging unit 202 which can be used to log events in the examples described herein. The logging unit 202, which may be a trace logging unit, comprises control logic 204 and a store 206. The control logic 204 may be implemented in hardware, software, firmware, or any combination thereof. The store 206 may be a memory and is configured to store entries for events, e.g. for events that have occurred in the computer system. In this example, the store 206 is included in the logging unit 202, whereas in other examples a store in which entries for events are logged may be external to the logging unit 202, and may for example be implemented in Random Access Memory (RAM) in a system memory 214. The computer system also comprises other elements which may be different in different examples, but in the example shown in FIG. 2 the computer system comprises a Central Processing Unit (CPU) 208, a signal processing unit 210 (e.g. a DSP), a Graphics Processing Unit (GPU) 212, the memory 214, and other devices 216, such as a display, a camera, speakers, etc., depending on the use for which the computer system is designed. The computer system also comprises a timing clock 218 which can be used by the logging unit 202 to determine the timestamps. It is noted that the timing clock 218 used by the logging unit 202 for determining the timestamps may be different (or the same in some examples) as a system clock used by the computer system to regulate the timing of the operations performed by the components of the computer system. The components of the computer system can communicate with each other via a communications bus 220. To give some examples, the computer system may be implemented in a device such as a mobile phone, tablet, laptop, television or any other suitable device. In an example, the signal processing unit 210 may be configured to process signals that have been received at the device or that are to be transmitted from the device (e.g. television signals, or communication signals over a suitable communication link, such as via a cellular telephone network and/or via the internet). Typically, such signal processing is performed at a very high rate, thereby creating events to be logged at a very high frequency. The other components in the computer system (e.g. the CPU 208, GPU 212, memory 214 and other devices 216) may also cause events to occur which are to be logged by the logging unit 202. The logging unit 202 may maintain separate logs for events from different components, or the events from different components may all be stored in the same log. The computer system shown in FIG. 2 may be an embedded system with a dedicated function, e.g. for receiving and processing broadcast signals in real-time, and as such the embedded system may include a subset of the components shown in FIG. 2 (e.g. an embedded system for signal processing might not include a GPU).

Operation of the logging unit 202 in a first example is described with reference to the flow chart shown in FIG. 3. Events occur in processing elements of the computer system shown in FIG. 2, and if those events are to be logged then, in step S302, the logging unit 202 receives indications of the events to be logged. In particular, the indications of the events are received at the control logic 204. The logging unit 202 may monitor the operation of the other processing elements in the computer system to detect the occurrence of events to be logged. Alternatively, or additionally, the processing elements in the computer system may send indications of events to the logging unit 202. In both implementations, the control logic 204 receives indications of events to be logged in step S302.

Figure 4:
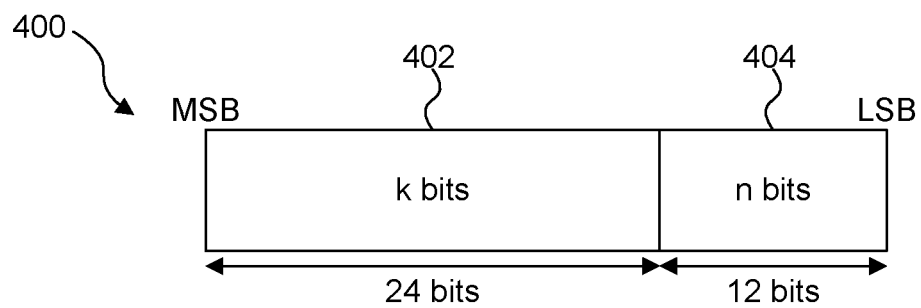
FIG. 4 shows the format of a timestamp in the first example.

In step S304 the control logic 204 determines an N-bit timestamp for the event which is to be logged. The timestamp is determined using the timing clock 218. FIG. 4 shows an example in which the timestamp 400 includes 36 bits (i.e. N=36). The timestamp 400 is made up of: (i) an upper section 402 comprising the k most significant bits, and (ii) a lower section 404 comprising the n least significant bits. In the example shown in FIG. 4, k=24 and n=12, wherein N=k+n. The n least significant bits of the timestamp are to be included in the timestamp field of an entry for the event that is logged in the store 206.

Figure 5:
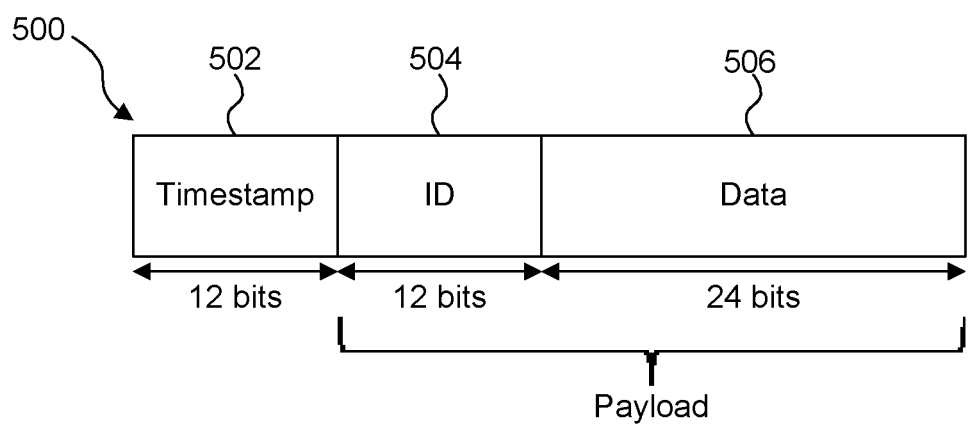
FIG. 5 shows the format of an entry for an event to be logged the logging unit.

FIG. 5 shows the format of an entry 500 for an event which is to be stored in the store 206. The entry 500 comprises an n-bit timestamp field 502 and a payload. In this example, n=12. The payload comprises an ID field 504 and a data field 506. In this example, the ID field 504 comprises 12 bits and the data field comprises k bits, where k=24. The ID field 504 includes an indication of the processing element (e.g. the CPU 208 or signal processing unit 210 or other processing element within the computer system shown in FIG. 2) that caused the event to occur. The data field 506 includes data relating to the event that occurred, e.g. to indicate that an exception has occurred, or to indicate that a variable has changed its value, etc.

In step S306 the control logic 204 determines whether there are other entries already stored in the store 206. If the current entry will be the first entry stored in the store then the method passes to step S310, otherwise the method passes to step S308. This is because for the first entry to be included in the store 206 there is no preceding entry, so all N bits of the timestamp are to be stored in the store 206.

In step S308 the control logic 204 determines whether the n least significant bits 404 of the timestamp 400 have wrapped compared to the corresponding n bits of a timestamp of a preceding entry that is stored in the store. Determining whether the lower section of the timestamp (i.e. the n least significant bits of the timestamp) has wrapped is equivalent to determining whether an upper section of the timestamp (i.e. the N−n most significant bits of the timestamp) has changed. In other words, when the n least significant bits of the timestamp have wrapped then one or more of the N−n most significant bits of the timestamp have changed. Therefore, it can be considered that in step S308, the control logic 204 determines whether one or more of the N−n most significant bits 402 of the timestamp 400 are different to a corresponding one or more of the N−n most significant bits of a timestamp for a preceding event for which a preceding entry is stored in the store. If it is determined in step S308 that the n least significant bits of the timestamp have wrapped then the method passes to step S310. If it is determined in step S308 that the n least significant bits of the timestamp have not wrapped then the method passes from step S308 to step S312.

In step S310 the control logic 204 causes a timing entry to be stored in the store 206. The timing entry includes the set of k bits 402 of the timestamp 400. The k bits of the timestamp 402 are included in the payload, e.g. in the data field 506, of the timing entry. The n least significant bits 404 of the timestamp 400 are included in the timestamp field 502 of the timing entry. The control logic 204 sets the ID field 504 of the timing entry to a predetermined value (e.g. a value of zero) which is indicative of a timing entry. In this way, timing entries can be identified in the store 206 by identifying entries which have the predetermined value in the ID field. Therefore, this provides a simple way to identify timing entries in the store 206.

In step S312 the control logic 204 causes an entry for the event to be stored in the store 206. The n least significant bits of the timestamp 400 are included in the timestamp field 502 of the entry 500 for the event. Data relating to the event is included in the payload of the entry 500 for the event. That is, the ID field 504 of the entry for the event includes an indication of the processing element (e.g. the signal processing unit 210) that caused the event to occur. The data field 506 includes data relating to the event that occurred.

It is noted that in the examples described herein, the store 206 in which entries for events are logged is part of the logging unit 202. However, in other examples, the store in which entries for events are logged may be external to the logging unit 202, and may for example be part of the memory 214, and may be implemented in general purpose RAM. In these other examples, the control logic 204 performs the same processes as in the examples described in detail herein to cause entries to be stored in the store (e.g. in memory 214) for events to be logged.

In some alternative examples, the logging unit 202 could use the internal store 206 to temporarily store the entries because it may be quicker for the logging unit to store data in the store 206 than to send data over the bus 220 for storage in an external memory (e.g. in memory 214). The entries stored in the store 206 can be copied to an external log store at appropriate times, e.g. periodically (i.e. at regular intervals), or when the amount of data stored in the store 206 exceeds a threshold, or when data traffic on the bus 220 is below a threshold, to give some examples.

Figure 3:
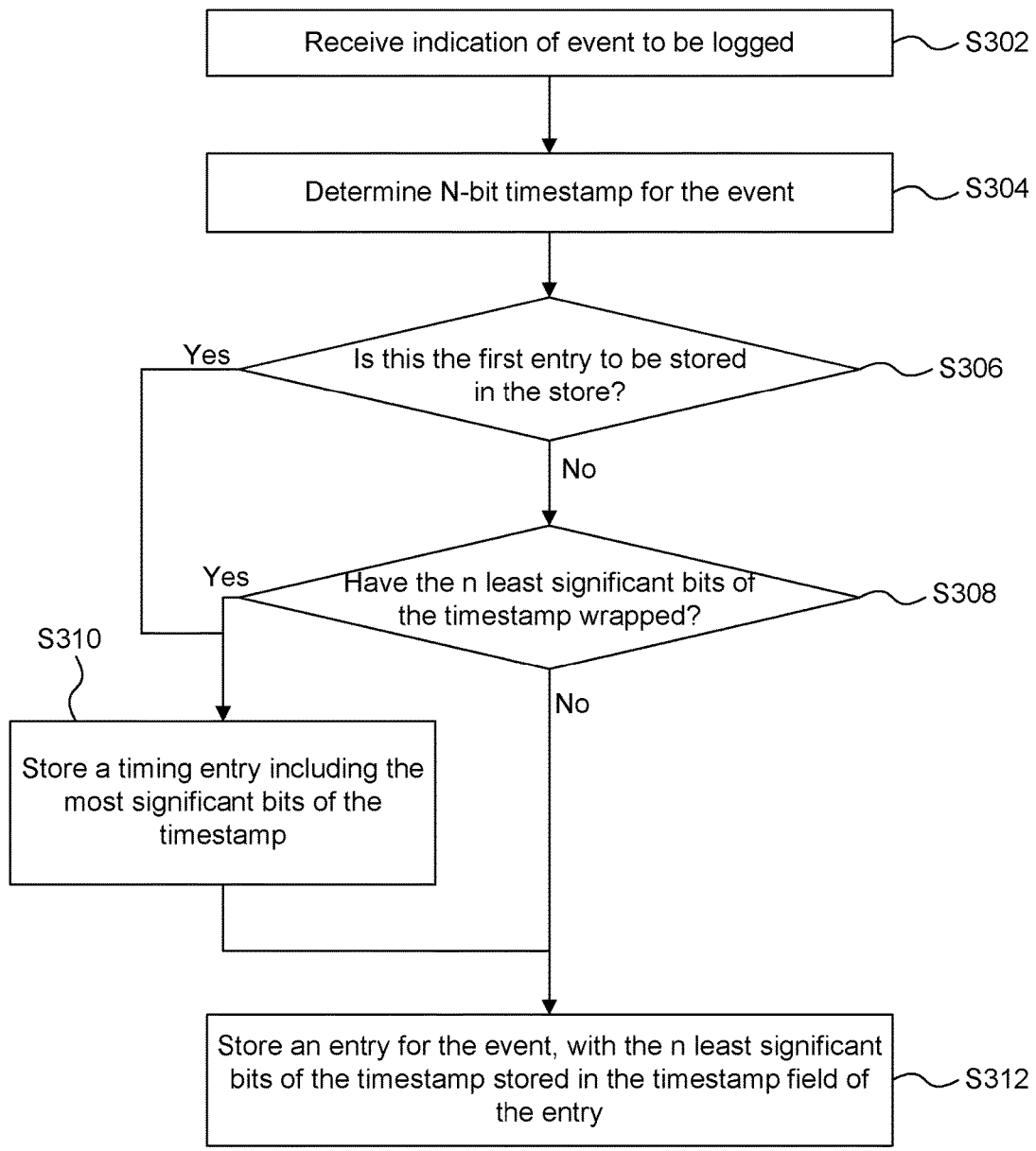
FIG. 3 shows a flow chart illustrating a method of logging events in a first example.

The method shown in FIG. 3 is performed for each of a plurality of events that occur in the computer system. If, in step S308, the control logic 204 determines that the N−n most significant bits of the timestamp are the same as the corresponding N−n most significant bits of the timestamp for a preceding event for which a preceding entry is stored in the store, then a timing entry does not need to be stored (i.e. step S310 is not performed). The "preceding event" is the most recent event for which an entry is stored in the store 206. The order in which the entries are stored in the store 206 is preserved, so that the most recently stored entry (and therefore the most recent event) is simple to identify in the store 206. The entry for the event includes the n least significant bits of the timestamp in the timestamp field. If the n least significant bits 404 of the timestamp have not wrapped, this means that the k most significant bits 402 of the timestamp are the same as the corresponding k bits of the timestamp of the preceding entry. So the k most significant bits of the timestamp do not need to be stored in the store 206 again, i.e. a timing entry is not needed.

In order to determine, in step S308, whether the n least significant bits of the timestamp have wrapped, the control logic 204 may identify the most recently stored timing entry in the store 206 and determine the k bits of a timestamp that are included in the payload of the timing entry. These k bits will be the same k bits of the timestamp for the most recently stored entry even if the most recently stored entry is not a timing entry. Alternatively, the logging unit 202 may include a dedicated section of memory which is used to indicate the k bits of a timestamp of the most recently stored timing entry, whereby whenever a new timing entry is stored in the store 206, the k bits previously stored in the dedicated section are replaced with the k bits of the timestamp for the new timing entry. In this way, the dedicated section of memory would include the k bits of the most recently stored timing entry and it is simple for the control logic 204 to retrieve these k bits in step S308 to determine the k bits of the timestamp of the preceding entry. However, this would use k bits of storage space in the logging unit 202. When the control logic 204 has determined the k bits of the timestamp of the event relating to the preceding entry, these bits are compared with the k bits of the timestamp determined in step S304, and if they are the same then the n least significant bits of the determined timestamp have not wrapped, but if they are different then the n least significant bits of the determined timestamp have wrapped.

Figures 6, 7:
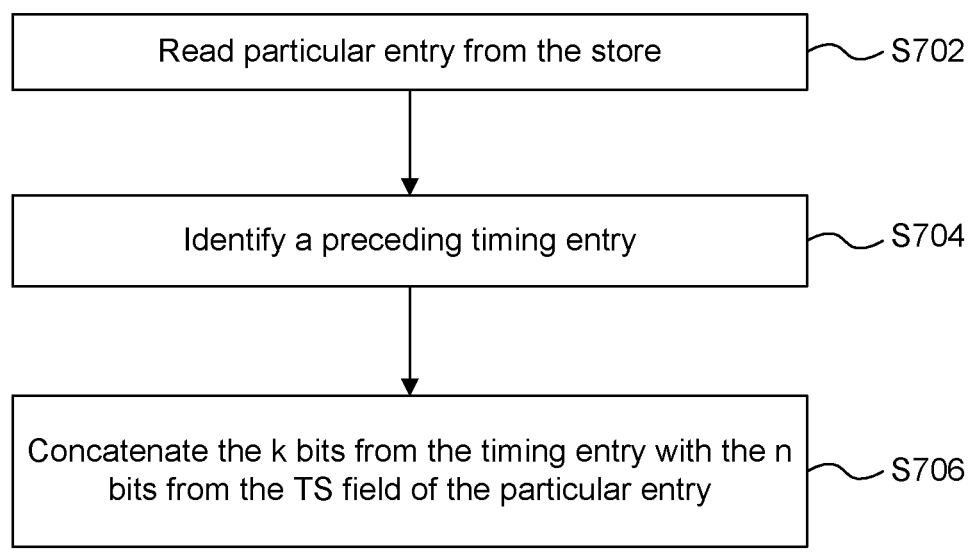
FIG. 6 shows a plurality of entries stored in a log store in the first example.
FIG. 7 shows a flow chart illustrating a method of retrieving information relating to a particular event from the log store in the first example.

FIG. 6 shows an example of a plurality of entries (602 to 614) stored in the store 206 for a sequence of five events (event 0 to event 4). In response to the first event (event 0) occurring, a timing entry 602 is stored in the store 206, in step S310. The n least significant bits of the timestamp for event 0 ($TS_0$) are stored in the timestamp field of the timing entry 602, and the k most significant bits of the timestamp for event 0 are stored in the data field of the timing entry 602. The ID field of the timing entry 602 includes a predetermined value, $ID_t$, which indicates that the entry 602 is a timing entry. Then in step S312, an entry 604 for event 0 is stored in the store 206. The n least significant bits of the timestamp for event 0 ($TS_0$) are stored in the timestamp field of the entry 604, an identifier of the source of event 0 ($ID_0$) is stored in the ID field of the entry 604, and data relating to event 0 is stored in the data field of the entry 604.

For the second event (event 1), the n least significant bits of the timestamp have not wrapped compared to the timestamp of event 0. Therefore a timing entry is not stored in the store 206 in response to event 1 occurring. In step S312, an entry 606 for event 1 is stored in the store 206. The n least significant bits of the timestamp for event 1 ($TS_1$) are stored in the timestamp field of the entry 606, an identifier of the source of event 1 ($ID_1$) is stored in the ID field of the entry 606, and data relating to event 1 is stored in the data field of the entry 606.

For the third event (event 2), the n least significant bits of the timestamp have not wrapped compared to the timestamp of event 1. Therefore a timing entry is not stored in the store 206 in response to event 2 occurring. In step S312, an entry 608 for event 2 is stored in the store 206. The n least significant bits of the timestamp for event 2 ($TS_2$) are stored in the timestamp field of the entry 608, an identifier of the source of event 2 ($ID_2$) is stored in the ID field of the entry 608, and data relating to event 2 is stored in the data field of the entry 608.

For the fourth event (event 3), the n least significant bits of the timestamp have not wrapped compared to the timestamp of event 2. Therefore a timing entry is not stored in the store 206 in response to event 3 occurring. In step S312, an entry 610 for event 3 is stored in the store 206. The n least significant bits of the timestamp for event 3 ($TS_3$) are stored in the timestamp field of the entry 610, an identifier of the source of event 3 ($ID_3$) is stored in the ID field of the entry 610, and data relating to event 3 is stored in the data field of the entry 610.

For the fifth event (event 4), the n least significant bits of the timestamp have wrapped compared to the timestamp of event 3. Therefore, a timing entry 612 is stored in the store 206, in step S310. The n least significant bits of the timestamp for event 4 ($TS_4$) are stored in the timestamp field of the timing entry 612, and the k most significant bits of the timestamp for event 4 are stored in the data field of the timing entry 612. The ID field of the timing entry 612 includes the predetermined value, $ID_t$, which indicates that the entry 612 is a timing entry. Then in step S312, an entry 614 for event 4 is stored in the store 206. The n least significant bits of the timestamp for event 4 ($TS_4$) are stored in the timestamp field of the entry 614, an identifier of the source of event 4 ($ID_4$) is stored in the ID field of the entry 614, and data relating to event 4 is stored in the data field of the entry 614.

It can be appreciated, from FIG. 6, that the most significant k bits of the timestamps for events 1, 2 and 3 do not need to be stored in the store 206 because they are the same as the most significant k bits of the timestamp for event 0 which are stored in the data field of the timing entry 602.

FIG. 7 shows a flow chart illustrating a method of retrieving information relating to a particular event from the store 206. In the example described below, the logging unit 202 is used to retrieve logging data from the store 206. In particular, in examples described below information relating to event 2 is retrieved from the store 206. However, as described above, in some other examples, the entries for the logged events may be stored in a log store which is external to the logging unit 202 (e.g. in RAM in memory 214). In these other examples, a unit other than the logging unit 202 may be used to retrieve logging data from the log store, but the principles of the retrieval of the logging data are the same as in the example described below in which it is the logging unit 202 that retrieves the logging data from the store 206.

In step S702 the control logic 204 reads the particular entry for the particular event (e.g. entry 608 for event 2) from the store 206. As described above, data relating to event 2 is included in the payload of entry 608. Also as described above, the n least significant bits of the timestamp for event 2 ($TS_2$) are stored in the timestamp field of the entry 608, so by reading entry 608, these n bits of the timestamp for the event can be determined. However, as described above, the full timestamp for event 2 comprises N bits, where N>n, so there are some bits of the timestamp for event 2 which are not included in the entry 608.

In step S704 the control logic identifies a timing entry preceding the particular entry in the store. This can be done by identifying an entry in the store 206 which has the predetermined value ($ID_t$) in its ID field. The identified timing entry is the timing entry most recently stored in the store 206 prior to the particular entry. So in this example, where entry 608 is the entry of the event for which information is being retrieved, the timing entry 602 is identified as being the timing entry most recently stored in the store 206 prior to the entry 608. The timing entry 602 has the k most significant bits of the timestamp in its data field.

In step S706 the control logic concatenates the k bits of the timestamp from the identified timing entry 602 with the n bits of the timestamp from the timestamp field of the entry 608 to thereby construct the timestamp for event 2. In this example, k=N−n such that the result of concatenating the k bits and the n bits is the N-bit timestamp for the event. In this way the N-bit timestamp for event 2 is determined even though only n of the bits of the timestamp are included in the entry 608 for event 2.

Figures 8, 10:
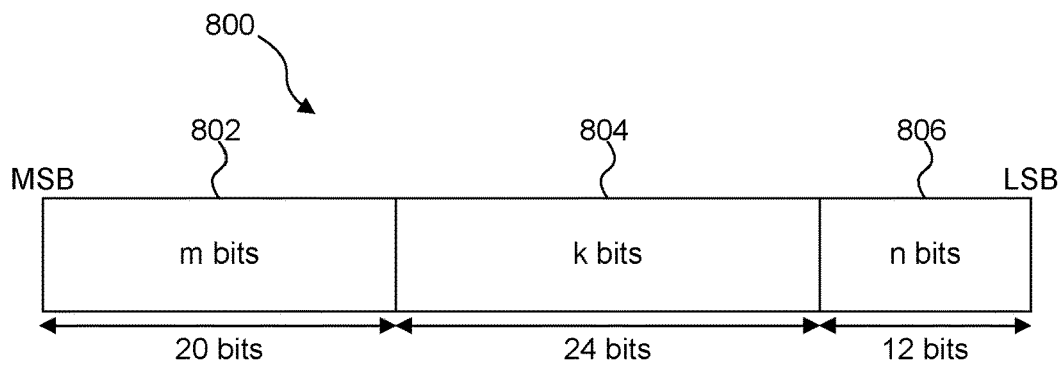
FIG. 8 shows the format of a timestamp in a second example.
FIG. 10 shows a plurality of entries stored in a log store in the second example.

In the examples described above, the N-bit timestamp is divided into just two sections: the most significant k bits 402 and the least significant n bits 404, as shown in FIG. 4, such that k=N−n. The k bits can be included in the data field of a timing entry. However, in other examples, the N-bit timestamp may be divided into more than two sections. In general, the timestamp may be an arbitrary length and it may be divided into an arbitrary number of sections. FIG. 8 shows an example of a timestamp 800 which comprises 56 bits (i.e. N=56), and which is divided into three sections: the most significant m bits 802, the next most significant k bits 804, and the least significant n bits 806. Therefore, in this example k<N−n. In particular, in this example, N=m+k+n.

Similarly to in the examples given above in relation to FIGS. 3 to 7, the k bits of the timestamp are more significant bits of the timestamp than the n least significant bits of the timestamp. In particular, the k bits of the timestamp are the k next least significant bits of the timestamp other than the n least significant bits of the timestamp. However, in the examples described with reference to FIGS. 8 to 11 the timestamp includes a further m bits 802 which are more significant than the k bits 804 of the timestamp 800. In the example shown in FIG. 8, the timestamp 800 is divided into three sections because it includes too many bits to put all of the bits of the timestamp except the n least significant bits into the data field of a timing entry.

Operation of the logging unit 202 in a second example is described with reference to the flow chart shown in FIG. 9. Events occur in processing elements of the computer system shown in FIG. 2, and if those events are to be logged then in step S902, the control logic 204 of the logging unit 202 receives indications of the events to be logged, as described above in relation to step S302.

In step S904 the control logic 204 determines an N-bit timestamp for the event which is to be logged. The timestamp is determined using the timing clock 218. In this example, the timestamp includes 56 bits as shown in FIG. 8. The n least significant bits 806 of the timestamp 800 are to be included in the timestamp field of an entry for the event that is logged in the store 206.

The format of the entries that are stored in the store 206 is the same as in the examples described above, and shown in FIG. 5. Therefore, an entry comprises an n-bit timestamp field 502 and a payload which includes an ID field and a data field, e.g. where n=12 and where the ID field comprises 12 bits and the data field comprises k bits, where k=24. In this example, there are two types of timing entry: (i) a first-level timing entry which includes k bits of a timestamp in its payload, and (ii) a second-level timing entry which includes m bits of a timestamp in its payload.

In step S906 the control logic 204 determines whether there are other entries already stored in the store 206. If the current entry will be the first entry stored in the store then the method passes to step S912, otherwise the method passes to step S908. This is because for the first entry to be included in the store 206 there is no preceding entry, so all N bits of the timestamp are to be stored in the store 206.

In step S908 the control logic 204 determines whether the n least significant bits 806 of the timestamp 800 have wrapped compared to the corresponding n bits of a timestamp of a preceding entry that is stored in the store. As described above, determining whether the lower section of the timestamp (i.e. the n least significant bits of the timestamp) has wrapped is equivalent to determining whether an upper section of the timestamp (i.e. the N−n most significant bits of the timestamp) has changed. Therefore, it can be considered that in step S908, the control logic 204 determines whether one or more of the N–n most significant bits (802 and 804) of the timestamp 800 are different to a corresponding one or more of the N–n most significant bits of a timestamp for a preceding event for which a preceding entry is stored in the store. If it is determined in step S908 that the n least significant bits of the timestamp have wrapped then the method passes to step S910. If it is determined in step S908 that the n least significant bits of the timestamp have not wrapped then the method passes from step S908 to step S916. The determination as to whether the n least significant bits of the timestamp have wrapped can be performed as described above, e.g. by determining the k bits of the timestamp of an event relating to the preceding entry in the store (e.g. by identifying the preceding first-level timing entry in the store 206, or retrieving this from a dedicated section of memory of the logging unit 202).

In step S910 the control logic 204 determines whether the k bits 804 of the timestamp 800 have wrapped compared to the corresponding k bits of a timestamp of an event for which a preceding entry is stored in the store 206. Determining whether the k bits of the timestamp have wrapped is equivalent to determining whether the N–k–n most significant bits of the timestamp have changed. Therefore, it can be considered that in step S910, the control logic 204 determines whether one or more of the N–k–n most significant bits 802 of the timestamp 800 are different to a corresponding one or more of the N–k–n most significant bits of a timestamp for a preceding event for which a preceding entry is stored in the store.

In order to determine, in step S910, whether the k bits of the timestamp have wrapped the control logic 204 may identify the most recently stored second-level timing entry in the store 206 and determine the m bits of a timestamp that are included in the payload of the second-level timing entry. These m bits will be the same m bits of the timestamp for the most recently stored entry even if the most recently stored entry is not a second-level timing entry. Alternatively, the logging unit 202 may include a dedicated section of memory which is used to indicate the m bits of a timestamp of the most recently stored second-level timing entry, whereby whenever a new second-level timing entry is stored in the store 206, the m bits previously stored in the dedicated section of memory are replaced with the m bits of the timestamp for the new second-level timing entry. In this way the dedicated section of memory would include the m bits of the most recently stored second-level timing entry and it is simple for the control logic 204 to retrieve these m bits in step S910 to determine the m bits of the timestamp of the preceding entry. However, this would use m bits of storage space in the logging unit 202. When the control logic 204 has determined the m bits of the timestamp of the event relating to the preceding entry, these bits are compared with the m bits of the timestamp determined in step S904, and if they are the same then the k bits of the determined timestamp have not wrapped, but if they are different then the k bits of the determined timestamp have wrapped.

If it is determined in step S910 that the k bits of the timestamp have wrapped then the method passes to step S912. If it is determined in step S910 that the k bits of the timestamp have not wrapped then the method passes from step S910 to step S914.

In step S912 the control logic 204 causes a second-level timing entry to be stored in the store 206. The second-level timing entry includes the set of m bits 802 of the timestamp 800. The m bits 802 of the timestamp 800 are included in the payload, e.g. in the data field 506, of the second-level timing entry. The n least significant bits 806 of the timestamp 800 are included in the timestamp field 502 of the second-level timing entry. The control logic 204 sets the ID field 504 of the second-level timing entry to a second predetermined value (e.g. a value of one) which is indicative of a second-level timing entry. In this way, second-level timing entries can be identified in the store 206 by identifying entries which have the second predetermined value in the ID field. Therefore, this provides a simple way to identify second-level timing entries in the store 206.

In step S914 the control logic 204 causes a first-level timing entry to be stored in the store 206. The first-level timing entry includes the set of k bits 804 of the timestamp 800. The k bits 804 of the timestamp 800 are included in the payload, e.g. in the data field 506, of the first-level timing entry. The n least significant bits 806 of the timestamp 800 are included in the timestamp field 502 of the first-level timing entry. The control logic 204 sets the ID field 504 of the first-level timing entry to a first predetermined value (e.g. a value of zero) which is indicative of a first-level timing entry. In this way, first-level timing entries can be identified in the store 206 by identifying entries which have the first predetermined value in the ID field. Therefore, this provides a simple way to identify first-level timing entries in the store 206.

In step S916 the control logic 204 causes an entry for the event to be stored in the store 206. The n least significant bits 806 of the timestamp 800 are included in the timestamp field 502 of the entry 500 for the event. Data relating to the event is included in the payload of the entry 500 for the event. That is, the ID field 504 of the entry for the event includes an indication of the processing element (e.g. the signal processing unit 210) that caused the event to occur. The data field 506 includes data relating to the event that occurred.

Figure 9:
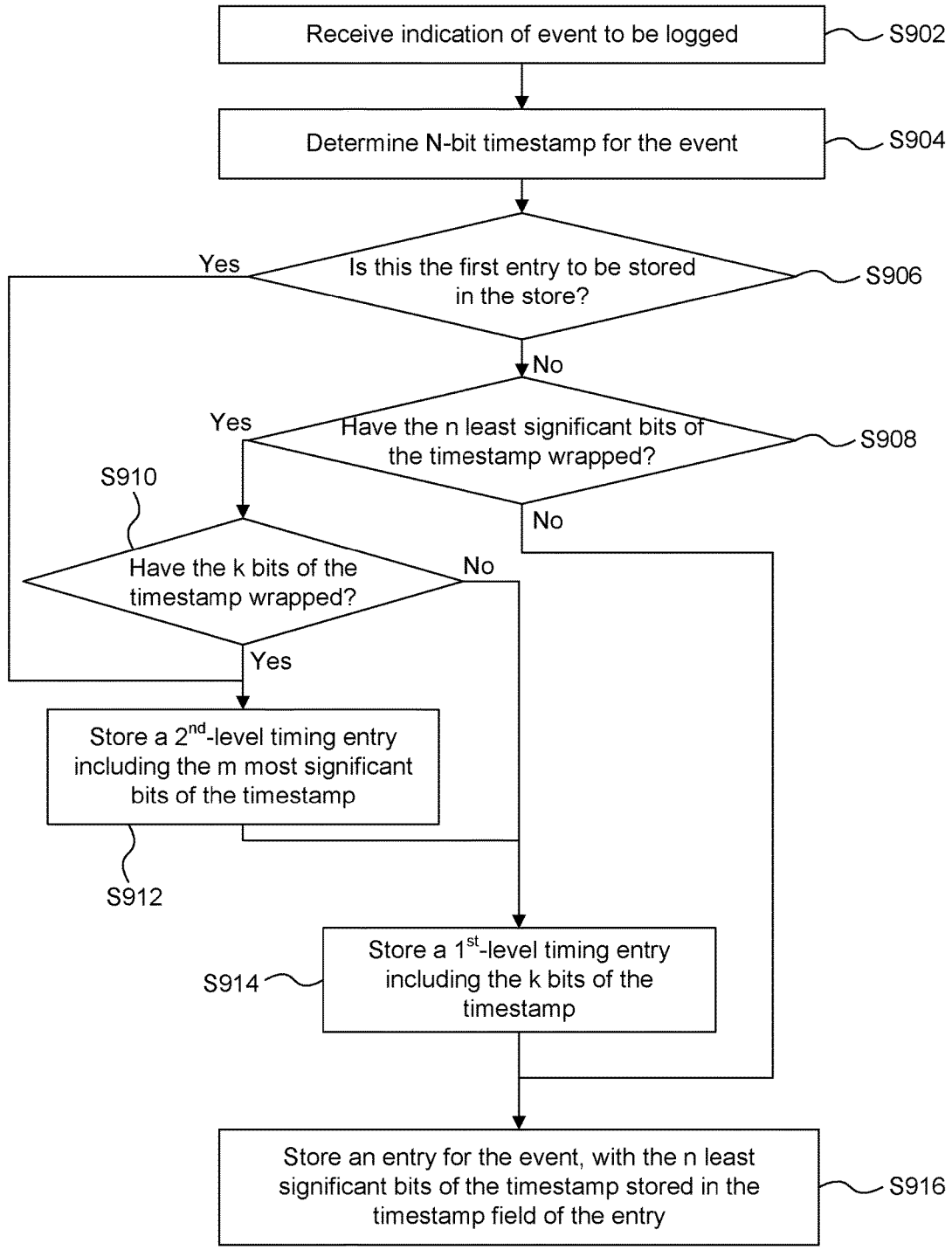
FIG. 9 shows a flow chart illustrating a method of logging events in the second example.

The method shown in FIG. 9 is performed for each of a plurality of events that occur in the computer system. If, in step S908, the control logic 204 determines that the n least significant bits of the timestamp have not wrapped compared to the corresponding n bits of the timestamp of a preceding entry that is stored in the store, then a timing entry does not need to be stored (i.e. steps S910, S912 and S914 are not performed). The "preceding entry" is the entry most recently stored in the store 206. The order in which the entries are stored in the store 206 is preserved, so that the most recently stored entry is simple to identify in the store 206. If the n least significant bits 404 of the timestamp have not wrapped, this means that the (m+k) most significant bits 802 and 804 of the timestamp are the same as the corresponding (m+k) bits of the timestamp of the preceding entry. So the (m+k) most significant bits of the timestamp do not need to be stored in the store 206 again, i.e. a timing entry is not needed.

FIG. 10 shows an example of a plurality of entries (1002 to 1022) stored in the store 206 for a sequence of six events (event 0 to event 5). In response to the first event (event 0) occurring, a second-level timing entry 1002 is stored in the store 206, in step S912. The n least significant bits of the timestamp for event 0 ($TS_0$) are stored in the timestamp field of the second-level timing entry 1002, and the m most significant bits of the timestamp for event 0 are stored in the data field of the second-level timing entry 1002. The ID field of the second-level timing entry 1002 includes a predetermined value, $ID_{t2}$, which indicates that the entry 1002 is a second-level timing entry. Then in step S914, a first-level timing entry 1004 is stored in the store 206. The n least significant bits of the timestamp for event 0 ($TS_0$) are stored in the timestamp field of the first-level timing entry 1004, and the k bits of the timestamp for event 0 are stored in the data field of the first-level timing entry 1004. The ID field of the first-level timing entry 1004 includes a predetermined value, $ID_{t1}$, which indicates that the entry 1004 is a first-level timing entry. Then in step S916, an entry 1006 for event 0 is stored in the store 206. The n least significant bits of the timestamp for event 0 ($TS_0$) are stored in the timestamp field of the entry 1006, an identifier of the source of event 0 ($ID_0$) is stored in the ID field of the entry 1006, and data relating to event 0 is stored in the data field of the entry 1006.

For the second and third events (event 1 and event 2), the n least significant bits of their timestamps have not wrapped compared to the timestamp of event 0. Therefore a timing entry is not stored in the store 206 in response to these events occurring. Instead, an entry 1008 for event 1 is stored in the store 206. The n least significant bits of the timestamp for event 1 ($TS_1$) are stored in the timestamp field of the entry 1008, an identifier of the source of event 1 ($ID_1$) is stored in the ID field of the entry 1008, and data relating to event 1 is stored in the data field of the entry 1008. An entry 1010 for event 2 is stored in the store 206. The n least significant bits of the timestamp for event 2 ($TS_2$) are stored in the timestamp field of the entry 1010, an identifier of the source of event 2 ($ID_2$) is stored in the ID field of the entry 1010, and data relating to event 2 is stored in the data field of the entry 1010.

For the fourth event (event 3), the n least significant bits of the timestamp have wrapped compared to the timestamp of event 2, but the k bits of the timestamp have not wrapped compared to the timestamp of event 2. Therefore, a first-level timing entry 1012 is stored in the store 206, in step S914. The n least significant bits of the timestamp for event 3 ($TS_3$) are stored in the timestamp field of the timing entry 1012, and the k bits of the timestamp for event 3 are stored in the data field of the first-level timing entry 1012. The ID field of the first-level timing entry 1012 includes the predetermined value, $ID_{t1}$, which indicates that the entry 1012 is a first-level timing entry. Then in step S916, an entry 1014 for event 3 is stored in the store 206. The n least significant bits of the timestamp for event 3 ($TS_3$) are stored in the timestamp field of the entry 1014, an identifier of the source of event 3 ($ID_3$) is stored in the ID field of the entry 1014, and data relating to event 3 is stored in the data field of the entry 1014.

For the fifth event (event 4), the n least significant bits of the timestamp have not wrapped compared to the timestamp of event 3. Therefore a timing entry is not stored in the store 206 in response to event 4 occurring. In step S916, an entry 1016 for event 4 is stored in the store 206. The n least significant bits of the timestamp for event 4 ($TS_4$) are stored in the timestamp field of the entry 1016, an identifier of the source of event 4 ($ID_4$) is stored in the ID field of the entry 1016, and data relating to event 4 is stored in the data field of the entry 1016.

For the sixth event (event 5), the n least significant bits of the timestamp and the k bits of the timestamp have wrapped compared to the timestamp of event 4. Therefore, a second-level timing entry 1018 is stored in the store 206, in step S912. The n least significant bits of the timestamp for event 5 ($TS_5$) are stored in the timestamp field of the second-level timing entry 1018, and the m most significant bits of the timestamp for event 5 are stored in the data field of the second-level timing entry 1018. The ID field of the second-level timing entry 1018 includes the predetermined value, $ID_{t2}$, which indicates that the entry 1018 is a second-level timing entry. Then in step S914, a first-level timing entry 1020 is stored in the store 206. The n least significant bits of the timestamp for event 5 ($TS_5$) are stored in the timestamp field of the first-level timing entry 1020, and the k bits of the timestamp for event 5 are stored in the data field of the first-level timing entry 1020. The ID field of the first-level timing entry 1020 includes the predetermined value, $ID_{t1}$, which indicates that the entry 1020 is a first-level timing entry. Then in step S916, an entry 1022 for event 5 is stored in the store 206. The n least significant bits of the timestamp for event 5 ($TS_5$) are stored in the timestamp field of the entry 1022, an identifier of the source of event 5 ($ID_5$) is stored in the ID field of the entry 1022, and data relating to event 5 is stored in the data field of the entry 1022.

It can be appreciated, from FIG. 10, that the m most significant bits of the timestamps for events 1, 2, 3 and 4 do not need to be stored in the store 206 because they are the same as the most significant m bits of the timestamp for event 0 which are stored in the data field of the second-level timing entry 1002. Furthermore, the k bits of the timestamps for events 1, 2 and 4 do not need to be stored in the store 206 because they are the same as either the k bits of the timestamp for event 0 which are stored in the data field of the first-level timing entry 1004 or the k bits of the timestamp for event 3 which are stored in the data field of the first-level timing entry 1012.

Figure 11:
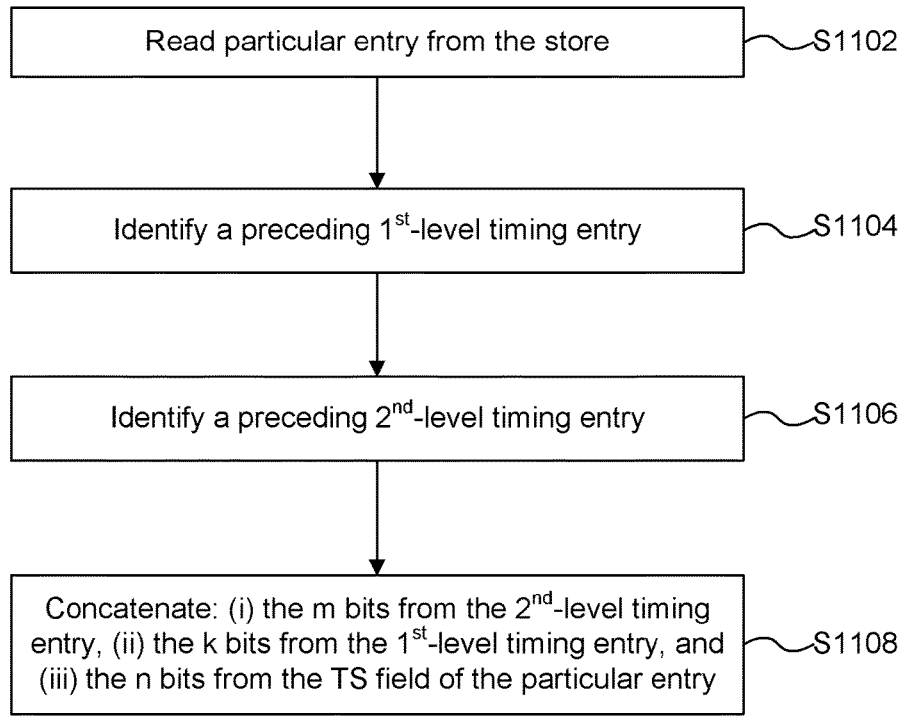
FIG. 11 shows a flow chart illustrating a method of retrieving information relating to a particular event from the log store in the second example.

FIG. 11 shows a flow chart illustrating a method of retrieving information relating to a particular event from the logging unit 202 when the timestamps are divided into three sections as described above in relation to FIGS. 8 to 10. In the example described below, the logging unit 202 is used to retrieve logging data from the store 206. In particular, in examples described below information relating to event 3 is retrieved from the store 206. However, as described above, in some other examples, the entries for the logged events may be stored in a log store which is external to the logging unit 202 (e.g. in RAM in memory 214). In these other examples, a unit other than the logging unit 202 may be used to retrieve logging data from the log store, but the principles of the retrieval of the logging data are the same as in the example described below in which it is the logging unit 202 that retrieves the logging data from the store 206.

In step S1102 the control logic 204 reads the particular entry for the particular event (e.g. entry 1014 for event 3) from the store 206. As described above, data relating to event 3 is included in the payload of entry 1014. Also as described above, the n least significant bits of the timestamp for event 3 ($TS_3$) are stored in the timestamp field of the entry 1014, so by reading entry 1014, these n bits of the timestamp for the event can be determined. However, as described above, the full timestamp for event 3 comprises N bits, where N>n, so there are some bits of the timestamp for event 3 which are not included in the entry 1014.

In step S1104 the control logic identifies a first-level timing entry preceding the particular entry in the store. This can be done by identifying an entry in the store 206 which has the predetermined value ($ID_{t1}$) in its ID field. The identified first-level timing entry is the first-level timing entry most recently stored in the store 206 prior to the particular entry. So in this example, where entry 1014 is the entry of the event for which information is being retrieved, the first-level timing entry 1012 is identified as being the first-level timing entry most recently stored in the store 206 prior to the entry 1014. The first-level timing entry 1012 has the k bits of the timestamp in its data field.

In step S1106 the control logic identifies a second-level timing entry preceding the particular entry in the store. This can be done by identifying an entry in the store 206 which has the predetermined value ($ID_{t2}$) in its ID field. The identified second-level timing entry is the second-level timing entry most recently stored in the store 206 prior to the particular entry. So in this example, where entry 1014 is the entry of the event for which information is being retrieved, the second-level timing entry 1002 is identified as being the second-level timing entry most recently stored in the store 206 prior to the entry 1014. The second-level timing entry 1002 has the m most significant bits of the timestamp in its data field.

In step S1108 the control logic concatenates the m bits of the timestamp from the identified second-level timing entry 1002 with the k bits of the timestamp from the identified first-level timing entry 1012 and the n bits of the timestamp from the timestamp field of the entry 1014 to thereby construct the timestamp for event 3. In this example, N=m+k+n such that the result of concatenating the m bits, the k bits and the n bits is the N-bit timestamp for the event. In this way the N-bit timestamp for event 3 is determined even though only n of the bits of the timestamp are included in the entry 1014 for event 3.

In accordance with the examples described above, the number of bits (N) included in a timestamp can be increased, such that the timestamp wraps less frequently, meaning that the time flow of the logged events is lost less frequently. This is achieved whilst also reducing the number of bits (n) that are included in the timestamp field of each of the entries, such that more bits of an entry can be used for the payload. The way this is achieved is by including additional timing entries when the n least significant bits of the timestamp have wrapped. There is a trade-off between the total timestamp wrap time $$\left(\frac{2^N}{f}\right),$$

the number of bits in a normal log entry (i.e. not a timing entry) dedicated to timestamps (n), and the total amount of log space taken up by timestamps in the store 206.

The examples described herein are particularly useful for trace logging where memory space for logging purposes may be particularly limited, e.g. compared to logging performed in logic analysers. The values of n, k, m and N can be set according to the conditions in which the logging unit is to be used (e.g. the expected frequency with which events occur), and also based on the frequency of the timing clock 218. Alternatively, the frequency of the timing clock 218 may be set based on one or more of: (i) an expected frequency of events, (ii) the value of n, and (iii) the value of N. Increasing the frequency of the timing clock 218 will increase the resolution of the timestamps thereby providing a greater accuracy for the relative timings of events stored in the store 206. However, increasing the frequency of the timing clock 218 will also decrease the time over which the timestamp will wrap. For example, with an N-bit timestamp and a timing clock frequency of f, the timestamp of an event at time t will be the same as the timestamp of an event at time $$t + \frac{2^N}{f}.$$

So as f increases, the wrapping time $$\left(\frac{2^N}{f}\right)$$

will decrease. Therefore there is a trade-off to consider between setting f high to distinguish between the timings of events and setting f low to avoid the timestamp becoming ambiguous due to there being a period in which no events occur such that the time flow of the logged events is lost. Therefore the frequency of the timing clock 218, f, is set based on the expected frequency of the events. For example, if the computer system is for signal processing in a WiFi transceiver, then events, which might include events indicating the arrival of packet headers and data payloads, are likely to occur quickly so the frequency of the timing clock 218 can be set to be high (e.g. at 350 MHz) to distinguish between the timings of different events. In a contrary example, if the computer system is for use in an e-reader, then events are likely to occur at a lower frequency, so the frequency of the timing clock 218 can be set to be lower (e.g. at 10 MHz) to avoid the timestamp becoming ambiguous in the time between events. As mentioned above, the timing clock 218 which is used by the logging unit 202 might not be used to regulate the timing of other components in the computer system, so setting the frequency of the timing clock 218 might not affect the clocks used by the other components of the computer system.

As described in the background section above, if the frequency of the timing clock is 350 MHz, an 18-bit timestamp will wrap every 749 μs $$\left(\text{i.e. } \frac{2^{18}}{350 \text{ MHz}} = 749 \text{ μs}\right).$$

However, when using a timing clock at 350 MHz, a 36-bit timestamp (e.g. as shown in FIG. 4) will wrap every 196 s $$\left(\text{i.e. } \frac{2^{36}}{350 \text{ MHz}} = 196 \text{ s}\right).$$

Furthermore, when using a timing clock at 350 MHz, a 56-bit timestamp (e.g. as shown in FIG. 8) will wrap approximately every 6½ years $$\left(\text{i.e. } \frac{2^{56}}{350 \text{ MHz}} = 2.06 \times 10^8 \text{ s} = 6.53 \text{ years}\right).$$

Any of the specific numbers given in the examples described above could be changed to other suitable values as would be apparent to a person skilled in the art. For example, in the examples described above each entry includes 48 bits, but in other examples the entries could include a different number of bits. Furthermore, in the examples described above, the payload of an entry includes an ID field and a data field. In other examples, the payload may include additional or alternative fields and the sizes of the fields may be different to those described above. Furthermore, in general, n≥1 and k≥1.

The embodiments described above, in which the timestamps are divided into two or three sections, are given by way of example only. More generally, as mentioned above, the timestamps may be divided into any number of sections or "levels". It would be apparent to a person skilled in the art how to implement the methods described herein with timestamps divided into more than three sections.

In the examples described above a timing entry includes, in its timestamp field, the n least significant bits of the timestamp for an event. For example, the timing entry 612 shown in FIG. 6 includes the n least significant bits ($TS_4$) of the timestamp for event 4 in its timestamp field. However, it is noted that there is duplication of the storage of the n least significant bits of a timestamp when a timing entry is stored. This can be seen in FIG. 6 in that when a timing entry is stored (e.g. timing entries 602 and 612), the bits in the timestamp field of the timing entry are the same as the bits in the timestamp field of the next entry in the store (e.g. entries 604 and 614). Therefore, in other examples, the timestamp field of a timing entry might include bits other than the n least significant bits of the timestamp. In this way, more timestamp bits can be included in a timing entry. For example, the value of k may be greater than the number of bits that can be included in the data field of an entry. For example, by comparison to FIGS. 4 and 5, a 48-bit timestamp could be used, where n=12 and k=36, and still only one level of timing entry may be used because a timing entry could include 36 bits of a timestamp. This can be done by including 24 bits of a timestamp in the data field 506 and a further 12 bits of the timestamp in the timestamp field 502 of a timing entry. In this way, the k bits of the timestamp are distributed over the data and timestamp fields of the timing entry. This does not cause a problem because the n least significant bits of the timestamp are included in the timestamp field of the next entry (e.g. in entries 604 and 614 shown in FIG. 6). In this way, the duplication of the storage of the n least significant bits of a timestamp is removed. For example, this would allow a 48-bit timestamp to be used (rather than a 36 bit timestamp as in the examples described above) at no extra cost in terms of needing to store extra timing entries. More generally, some bits of the set of k bits of the timestamp may be included in the payload of the timing entry, and other bits of the set of k bits of the timestamp may be included in the timestamp field of the timing entry.

Generally, any of the functions, methods, techniques or components described above (e.g. the logging unit 202) can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation of the control logic 204, the control logic represents program code that performs specified tasks when executed on a processor. In one example, the control logic described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods described herein may be carried out by a dedicated circuit, an application-specific integrated circuit, a programmable logic array, a field-programmable gate array, or the like. For example, the module, functionality, component, unit or logic (e.g. the logging unit 202 and its components) may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component, unit or logic (e.g. the components of the logging unit 202) may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component, unit or logic (e.g. the components of the logging unit 202) described above, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a logging unit configured to perform any of the methods described herein, or to manufacture a logging unit comprising any apparatus described herein. The IC definition dataset may be in the form of computer code, e.g. written in a suitable HDL such as register-transfer level (RTL) code. An example of processing an integrated circuit definition dataset at an integrated circuit manufacturing system so as to configure the system to manufacture a logging unit will now be described with respect to FIG. 12.

Figure 12:
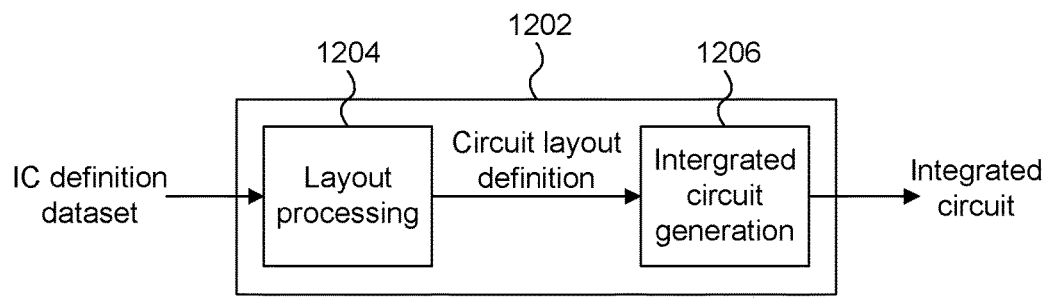
FIG. 12 shows an integrated circuit manufacturing system for generating an integrated circuit embodying a processing system.

FIG. 12 shows an example of an integrated circuit (IC) manufacturing system 1202 which comprises a layout processing system 1204 and an integrated circuit generation system 1206. The IC manufacturing system 1202 is configured to receive an IC definition dataset (e.g. defining a logging unit as described in any of the examples herein), process the IC definition dataset, and generate an IC according to the IC definition dataset (e.g. which embodies a logging unit as described in any of the examples herein). The processing of the IC definition dataset configures the IC manufacturing system 1202 to manufacture an integrated circuit embodying a logging unit as described in any of the examples herein. More specifically, the layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC. The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a logging unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some examples, an integrated circuit definition dataset could include software which runs on hardware defined by the dataset or in combination with hardware defined by the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A logging unit for logging events in a computer system by causing entries to be stored in a store, wherein each of said entries comprises an n-bit timestamp field and a payload, the logging unit comprising control logic configured to: determine a timestamp for an event which is to be logged, wherein the determined timestamp comprises N bits, where N>n;

determine whether one or more of the N−n most significant bits of the determined timestamp are different to a corresponding one or more of the N−n most significant bits of a timestamp for a preceding event for which a preceding event entry is stored in the store;

cause a timing entry which includes a set of k bits of the determined timestamp to be stored in the store in response to determining that one or more of the N most significant bits of the determined timestamp are different to a corresponding one or more of the N−n most significant bits of a timestamp for a preceding event for which a preceding event entry is stored in the store, said k bits being more significant bits of the determined timestamp than the n least significant bits of the determined timestamp; and cause an event entry for the event to be stored in the store, wherein the n least significant bits of the determined timestamp are included in the timestamp field of the event entry for the event.

2. The logging unit of claim 1 wherein said k bits are the k next least significant bits of the determined timestamp other than the n least significant bits of the determined timestamp.

3. The logging unit of claim 1 wherein the control logic is configured to cause the set of k bits of the determined timestamp to be included in the payload of the timing entry.

4. The logging unit of claim 1 wherein the control logic is configured to cause the n least significant bits of the determined timestamp to be included in the timestamp field of the timing entry.

5. The logging unit of claim 1 wherein the control logic is configured to: cause some bits of the set of k bits of the determined timestamp to be included in the payload of the timing entry, and cause other bits of the set of k bits of the determined timestamp to be included in the timestamp field of the timing entry.

6. The logging unit of claim 1 wherein said preceding event is the most recent event for which an event entry is stored in the store.

7. The logging unit of claim 1 wherein the control logic is configured to cause data relating to the event to be included in the payload of the event entry for the event.

8. The logging unit of claim 1 wherein the payload of an entry includes: (i) an ID field, and (ii) a data field.

9. The logging unit of claim 8 wherein the control logic is configured to set the ID field of the timing entry to a predetermined value which is indicative of a timing entry.

10. The logging unit of claim 1 wherein the control logic is configured to determine the timestamp for the event which is to be logged using a timing clock, and wherein the frequency of the timing clock is set based on one or more of: (i) an expected frequency of events, (ii) the value of n, and (iii) the value of N.

11. The logging unit of claim 1 wherein k=N−n, wherein the k bits are the most significant bits of the determined timestamp.

12. The logging unit of claim 1 wherein k<N−n, wherein said timing entry including the set of k bits of the determined timestamp is a first-level timing entry, and wherein the control logic is further configured to cause a second-level timing entry which includes a set of m bits of the determined timestamp to be stored in the store if one or more of the N−k−n most significant bits of the determined timestamp are different to a corresponding one or more of the N−k−n most significant bits of the timestamp for the preceding event for which the preceding event entry is stored in the store, said m bits being more significant bits of the determined timestamp than the k bits of the determined timestamp.

13. The logging unit of claim 12 wherein the payload of an entry includes: (i) an ID field, and (ii) a data field, and wherein the control logic is configured to:
set ID fields of first-level timing entries to a first predetermined value which is indicative of a first-level timing entry; and
set ID fields of second-level timing entries to a second predetermined value which is indicative of a second-level timing entry.

14. The logging unit of claim 1 wherein the control logic is further configured to:
read a particular event entry for a particular event from the store; and
construct the timestamp for the particular event by: (i) identifying a timing entry preceding the particular event entry in the store, and (ii) concatenating the k bits of the timestamp from the identified timing entry with the n bits of the timestamp from the timestamp field of the particular event entry.

15. The logging unit of claim 14 wherein the identified timing entry is the most recent timing entry stored in the store prior to the particular event entry.

16. A method of logging events in a computer system by storing entries in a store, each of said entries comprising an n-bit timestamp field and a payload, the method comprising:
determining a timestamp for an event which is to be logged, wherein the determined timestamp comprises N bits, where N>n;
determining whether one or more of the N−n most significant bits of the determined timestamp are different to a corresponding one or more of the N−n most significant bits of a timestamp for a preceding event for which a preceding event entry is stored in the store;
in response to determining that one or more of the N−n most significant bits of the determined timestamp are different to a corresponding one or more of the N−n most significant bits of a timestamp for a preceding event for which a preceding event entry is stored in the store, storing a timing entry in the store, said timing entry including a set of k bits of the determined timestamp, said k bits being more significant bits of the determined timestamp than the n least significant bits of the determined timestamp; and
storing an event entry for the event in the store, wherein the n least significant bits of the determined timestamp are included in the timestamp field of the event entry for the event.

17. A method of retrieving, from a store configured to store entries, information relating to a particular event in a computer system, each of said entries comprising an n-bit timestamp field and a payload, and wherein the particular event is associated with a timestamp comprising N bits, where N>n, the method comprising:
reading a particular event entry for the particular event from the store, wherein the n least significant bits of the timestamp are included in the timestamp field of the particular event entry;
identifying a timing entry preceding the particular event entry in the store, wherein the identified timing entry includes a set of k bits of the timestamp for the particular event, said k bits being more significant bits of the timestamp than the n least significant bits of the timestamp;
concatenating the k bits of the timestamp from the identified timing entry with the n bits of the timestamp from the timestamp field of the particular event entry, for use in constructing the timestamp for the particular event; and
outputting the constructed timestamp for the particular event.

18. The method of claim 17 wherein k=N−n wherein the result of said concatenation is the timestamp for the particular event.

19. The method of claim 18 wherein k<N−n, wherein said identified timing entry is a first-level timing entry, and wherein the method further comprises:
identifying a second-level timing entry preceding the identified first-level timing entry in the store, wherein the identified second-level timing entry includes a set of m bits of the timestamp for the particular event, said m bits being more significant bits of the timestamp than the k bits of the timestamp;
wherein the m bits of the timestamp from the identified second-level timing entry are concatenated with the k bits of the timestamp from the identified first-level timing entry and the n bits of the timestamp from the timestamp field of the particular event entry, for use in constructing the timestamp for the particular event.

20. A non-transitory computer readable storage medium having stored thereon a computer readable description of an integrated circuit that, when processed in an integrated circuit manufacturing system, causes the integrated circuit manufacturing system to manufacture a logging unit, the logging unit being for logging events in a computer system by causing entries to be stored in a store, wherein each of said entries comprises an n-bit timestamp field and a payload, the logging unit comprising control logic configured to:
determine a timestamp for an event which is to be logged, wherein the determined timestamp comprises N bits, where N>n;

determine whether one or more of the N–n most significant bits of the determined timestamp are different to a corresponding one or more of the N–n most significant bits of a timestamp for a preceding event for which a preceding event entry is stored in the store;

cause a timing entry which includes a set of k bits of the determined timestamp to be stored in the store in response to determining that one or more of the N most significant bits of the determined timestamp are different to a corresponding one or more of the N–n most significant bits of a timestamp for a preceding event for which a preceding event entry is stored in the store, said k bits being more significant bits of the determined timestamp than the n least significant bits of the determined timestamp; and cause an event entry for the event to be stored in the store, wherein the n least significant bits of the determined timestamp are included in the timestamp field of the event entry for the event.

* * * * *